Sept. 4, 1928.
E. P. OFFEMARIA
1,683,095
VALVE LEAK AND PUNCTURE DETECTOR
Filed Feb. 15, 1927
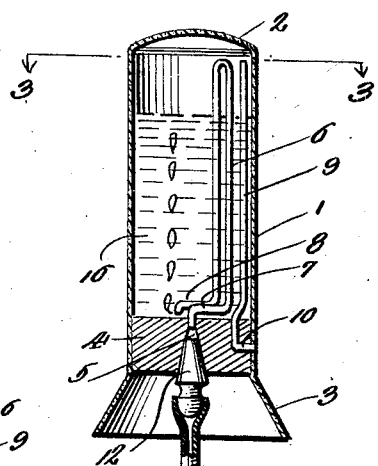
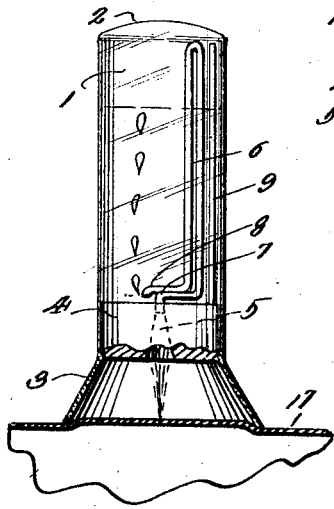
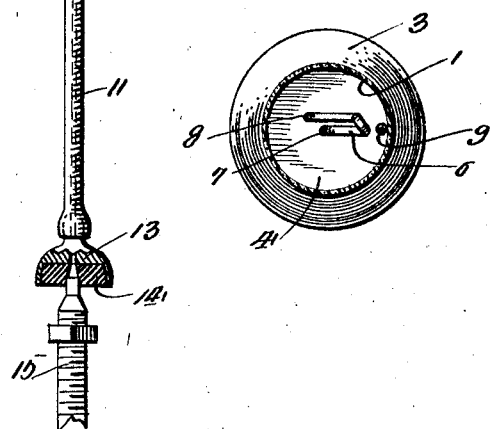
WITNESSES
Inventor
ENGRACIO P. OFFEMARIA
By
Richard B. Owen, Attorney Patented Sept. 4, 1928.

1,683,095

UNITED STATES PATENT OFFICE.

ENGRACIO P. OFFEMARIA, OF CHICAGO, ILLINOIS.

VALVE LEAK AND PUNCTURE DETECTOR.

Application filed February 15, 1927. Serial No. 168,428.

The invention relates to the class of signals and indicators and pertains particularly to a device for indicating the presence of a leak in a tire valve or tube.

The primary object of this invention is to provide, in a manner as hereinafter set forth, a device for detecting at any time during night or day, a leaking valve and for locating a leak in an inner tube.

Another object is to provide a device of the above described character which is easy to manipulate and to apply particularly with reference to a tire valve stem, as the device may be applied to the stem when the same is in any position.

A further and final object of this invention is to provide a testing device of the character described, which is small and may be conveniently carried in the pocket.

Numerous other objects and advantages of this invention will become apparent as the description of the same proceeds, and the invention will be best understood from a consideration of the following detailed description taken in connection with the accompanying drawing forming a part of this specification, with the understanding, however, that the invention is not confined to any strict conformity with the showing of the drawing, but may be changed or modified so long as such changes or modifications mark no material departure from the salient features of the invention as expressed in the appended claims.

In the drawing:

Figure 1 is a longitudinal sectional view of the device embodying this invention.

Figure 2 shows the device as used for detecting a leak in an inner tube.

Figure 3 is a transverse section taken upon the line 3—3 of Figure 1.

Referring now to the drawing in detail wherein like numerals of reference indicate corresponding parts throughout the several views, it will be seen that the device comprises a relatively long glass tube 1 having one end closed as indicated at 2 and having the flaring surrounding lip 3 at the other and open end.

Within the open end or mouth of the body a closure plug of cork, rubber or other suitable material, is fitted, as indicated by the numeral 4. This closure plug has a central passage formed therethrough as indicated at 5 which passage is of gradually decreasing diameter from the outer to the inner end.

Within the glass tube or casing 1 is an air inlet tube 6 which is of substantially U-shaped contour, the free end of each leg which is turned at an angle to the other portion of the leg as indicated by the numerals 7 and 8, the portion 7 being fitted into the inner end of the passage 5 of the plug 4, while the portion 8 opens into the interior of the tube adjacent the inner face of the plug 4.

The plug body 4 also carries an air outlet tube 9 which has the lower end embedded therein and turned at right angles as indicated at 10 to register with an aperture in the wall of the tube. The other end of the tube 9 opens into the body 1 adjacent the upper end thereof, as clearly shown in Figures 1 and 2.

For the employment of the device to test a tire valve there is provided a flexible tube of substantial length, as indicated at 11, one end of which engages over a tapering nozzle 12 which is designed to be extended into and frictionally held in the enlarged outer end of the passage 5, of the plug body 4. The other end of the tube 11 engages over the nipple of a cap body 13 in which cap a centrally apertured rubber or fibre packing 14 is secured, and into the aperture of this packing the tip of a valve, such as that indicated by the numeral 15, is extended. The glass body 1 normally contains a quantity of liquid 16, which liquid is preferably of a phosphorescent character, such, for example, as water in which phosphorous has been kept, or if desired, a small piece of phosphorus may be kept in the water in the glass body, and when the cap body 13 is engaged over the discharge end of a leaking valve, in the manner shown in Figure 1, it will be readily understood that escaping air will pass through the tubes 11 and 6 and escape through the angled end 8 of the tube 6 into the liquid 16, its presence being made known by the rise of air bubbles through the liquid. By using a phosphorescent liquid as above described, it will be readily understood that the presence of a puncture may be readily detected at night for the air rising through such a liquid will be clearly seen in absolute darkness. While applicant has given two examples of the phosphorescent liquid which may be used, it is to be understood that he does not wish to be limited to these two for any suitable liquid may be used.

In the employment of the device for the detection of leaks in inner tubes, the nozzle 12 of the tube 11 is removed from engagement with the plug body 4 and the flaring lip portion 3 of the body is pressed upon the surface of a tube 17, containing a quantity of air and while thus pressed upon the tube is slowly passed over the surface of the same. It will be seen that as soon as the mouth of the liquid containing body 1 moves to position over a hole in the tube, the air escaping therefrom will pass upwardly through the passage 5 and through the pipe 6 to be discharged into the lower portion of the liquid body 16 in the same manner as described above in connection with the application of the device to a valve stem.

The air after rising to the upper portion of the body 1 will leave the same through the pipe 9, escaping to the atmosphere through the laterally directed portion 10 of the pipe, which opens through the wall of the body.

Having thus described my invention, what I claim is:

1. A testing device of the character described, comprising a relatively long transparent hollow body having one end closed and having the edge of the other and open end flared outwardly throughout to catch air escaping from a punctured inner tube, a closure plug in said open end inwardly of the flared edge portion thereof, and having a central aperture formed therethrough, an air tube leading from the aperture of said plug to the opposite end of the body and returned to arrange the other end thereof adjacent the closure plug, a liquid partially filling said body, and an air escape tube extending throughout the interior of the body and having one end opening thereinto and further having the other end extended through the closure plug and opening to the atmosphere through the wall of the body.

2. A testing device of the character described, comprising a relatively long transparent hollow body having one end closed and having the edge of the other and open end flared outwardly throughout, a closure plug in said open end inwardly of the flared edge portion thereof and having a central aperture formed therethrough, an air tube leading from the aperture of said plug to the opposite end of the body and returned to arrange the other end thereof adjacent the closure plug, a liquid partially filling said body, an air escape tube extending throughout the interior of the body and having one end opening thereinto and further having the other end extended through the closure plug and opening to the atmosphere through the wall of the body, an air tube, a nozzle connected to one end of said air tube and adapted to frictionally engage in the aperture of said plug, and a tubular cap body carried at the other end of said air tube and designed to engage over the end of an air valve.

3. In a tire valve leak detector of the character described, the combination with a receptacle having a tube body leading thereinto and adapted to be attached to a tire valve, of a liquid having phosphorescent characteristics contained in the receptacle to indicate in the dark the passage of air bubbles therethrough escaping from the attached tube body.

4. In a tire valve leak detector of the character described, the combination with a receptacle having means for conveying air thereinto from the leak of a punctured inner tube when said means is placed thereover, of a liquid, having phosphorescent characteristics contained in the receptacle to indicate in the dark the passage of air bubbles therethrough.

In testimony whereof I affix my signature.

ENGRACIO P. OFFEMARIA.